A. C. CAMBRIDGE.
BICYCLE AND LAMP.
APPLICATION FILED APR. 18, 1919.
1,315,088.
Patented Sept. 2, 1919.
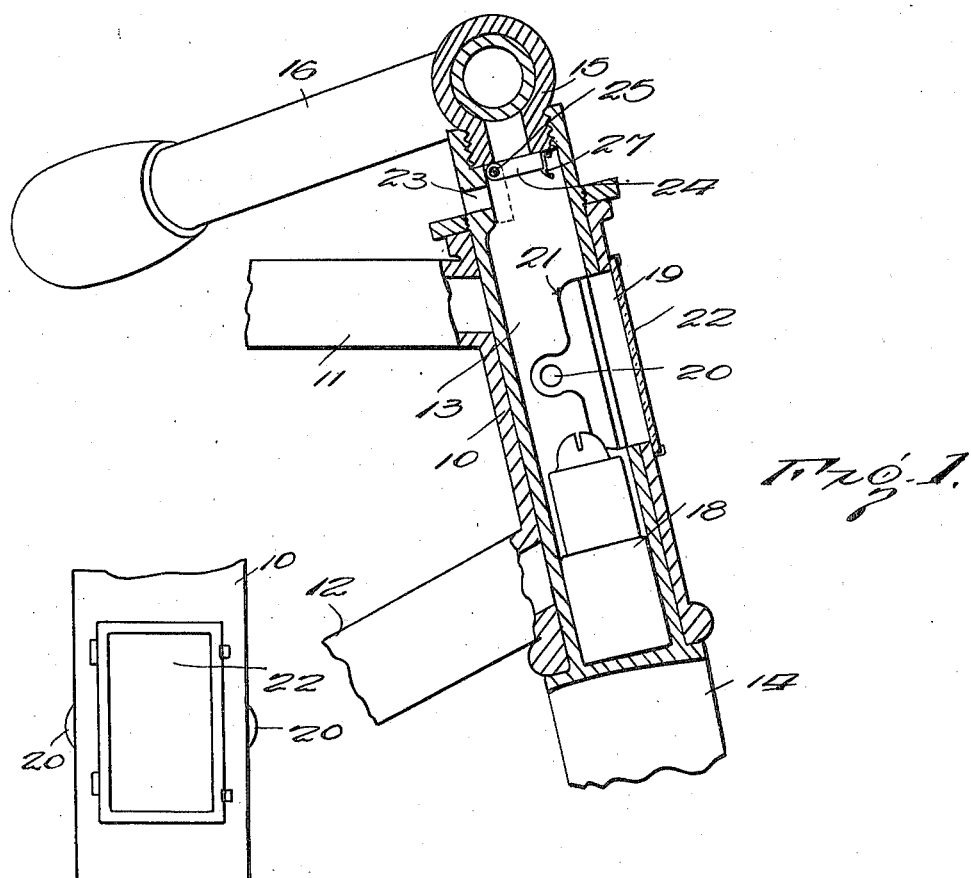
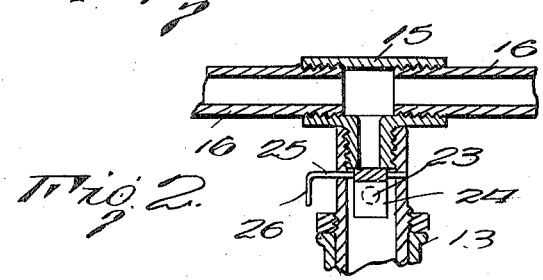
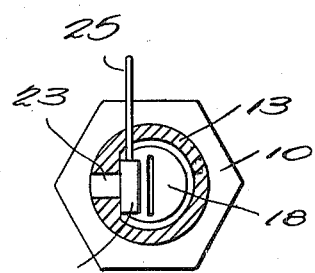
Alonzo C. Cambridge
Inventor
By Geo. P. Kimmel
Attorney

UNITED STATES PATENT OFFICE.

ALONZO C. CAMBRIDGE, OF CHARLESTON, SOUTH CAROLINA.

BICYCLE AND LAMP.

1,315,088.  Specification of Letters Patent.  Patented Sept. 2, 1919.

Application filed April 18, 1919. Serial No. 291,093.

*To all whom it may concern:*

Be it known that I, ALONZO C. CAMBRIDGE, a citizen of the United States, residing at Charleston, in the county of Charleston and State of South Carolina, have invented certain new and useful Improvements in Bicycles and Lamps, of which the following is a specification.

This invention relates to an improved bicycle construction and has special reference to the front fork construction, the front fork being provided with lamp holding means so that a lamp may be placed in the post of the front fork to show through the sleeve mounting the front fork thus providing a head light.

Another object of the invention is to so construct this bicycle that the lamp may serve as means for heating the handle bars thus providing means for warming the hands of the rider in cold weather and thereby permitting the lamp to serve as a heating device for the handle bars as well as serving as a head light.

Another object of the invention is to so construct this device that the lamp may be readily put in place and removed when necessary without the post and bearing sleeve being materially weakened.

This invention is illustrated in the accompanying drawings wherein

Figure 1 is a view showing the improved construction in vertical section,

Fig. 2 is a fragmentary sectional view through the upper portion of Fig. 1 and taken at right angles to Fig. 1, Fig. 3 is a transverse sectional view through the upper portion of the structure shown in Fig. 1, and, Fig. 4 is a fragmentary view in front elevation showing the closure for the opening in the front of the sleeve.

The drawings illustrate a fragment of the forward portion of a bicycle and show the sleeve 10 from which extends the cross bars 11 and 12, the sleeve serving as a bearing for the standard 13 of the fork 14. This standard extends through the sleeve 10 and carries the post 15 with which the handle bars 16 are connected. It should be noted that the post 15 and handle bars 16 are hollow for the purpose to be hereinafter brought out.

The lamp 18 is positioned within the hollow standard 13 in the lower end thereof and when lighted will show through the forward opening 19 and side opening 20 of the bearing sleeve 10, the standard being provided with a cut out 21 for registering with these openings and a closure 22 being provided for the opening 19 and removably mounted so that it can be removed when it is desired to light the lamp or remove the same for renewing fuel or cleaning purposes. It is of course understood that transparent closures will be provided for the side openings but that these do not need to be removable. The products of combustion from this lamp will pass out of the standard either through the side opening 23 or through the post 15 and handle bars 16 which will be open at their outer ends and in order to control the passage of the products of combustion there has been provided a valve plate 24 pivotally mounted in the upper portion of the standard and preferably hingedly connected with the inner end of the post 15 through the medium of a pivot pin 25. This pivot pin 25 extends through the wall of the standard above the sleeve and has its outer end portion bent to provide a handle 26 thus permitting the valve plate to be easily swung into and out of engagement with the catch 27. Therefore the valve plate can be swung to the position shown in Fig. 1 thus closing the inlet at the lower end of the handle post 15 and causing the products of combustion to pass out through the opening 23 or it can be swung downwardly to close the opening 23 and permit the products of combustion to pass out through the post and handle bars thus heating the handle bars and permitting the hands of the rider to be warmed through engagement with the handle bars.

From the above description the construction and operation of this improved device will be clear and it will be readily seen that when in use the lamp will be placed within the hollow standard and when lighted the light will show through the openings 19 and 20 to serve as a head light. As this lamp is to serve as a heater as well as a head light it can be lighted during the day time as well as during the night and during cold weather the handle bars may be kept warm thus preventing the rider's fingers from becoming numb through grasping the cold handle bars.

What I claim is:

1. A bicycle having a frame structure including a forward bearing sleeve, a fork having a standard extending through the bearing sleeve, handle bars having a post connecting the handle bars with the upper end of the standard, the standard, handle bars and post being hollow and the standard being provided with an outlet opening adjacent its upper end and with a sight opening for registering with a sight opening formed in the bearing sleeve, a closure for the sight opening in the bearing sleeve, a source of heat and light within the standard, and a closure movably mounted in the upper portion of the standard for selectively closing the outlet opening of the standard and the lower end of the handle bar post.

2. The combination with a bicycle frame having a bearing sleeve and fork provided with a hollow standard positioned in the sleeve and provided with an opening for registering with an opening in the sleeve, of a source of light positioned in the hollow standard and viewed through the openings of the standard and sleeve.

3. The combination with a bicycle including a bearing sleeve, a wheel fork having a hollow standard extending through the bearing sleeve and hollow handle bars connected with and communicating with the hollow standard, the standard and sleeve having registering openings, of a source of heat and light positioned in the hollow standard for supplying warmth to the handle bars and displaying a light through the openings of the sleeve and standard.

4. The combination with a bicycle including a bearing sleeve, a wheel fork having a hollow standard extending through the sleeve and provided with an opening for registering with an opening in the sleeve, a hollow post connected with the standard and hollow handle bars connected with the post, of a lamp positioned in the hollow standard and means for closing the lower end portion of said post and directing products of combustion through a side opening in the standard.

In testimony whereof, I affix my signature hereto.

ALONZO C. CAMBRIDGE.